United States Patent [19]

Takahashi et al.

[11] Patent Number: 5,337,536
[45] Date of Patent: Aug. 16, 1994

[54] PACKAGING APPARATUS

[75] Inventors: Hisashi Takahashi; Shigehisa Shimizu; Takayuki Fujiwara; Satoshi Mino; Tatsuo Sugii, all of Kanagawa, Japan

[73] Assignee: Fuji Photo Film Co., Ltd., Kanagawa, Japan

[21] Appl. No.: 962,844

[22] Filed: Oct. 19, 1992

[30] Foreign Application Priority Data

Oct. 18, 1991 [JP] Japan .................. 3-270862

[51] Int. Cl.$^5$ .................... B65B 11/04; B65B 61/18
[52] U.S. Cl. .................... 53/135.3; 53/204; 53/211; 53/214
[58] Field of Search .............. 53/135.1, 135.2, 135.3, 53/138.1, 140, 372.9, 389.5, 204, 211, 214, DIG. 2, 209, 210

[56] References Cited

U.S. PATENT DOCUMENTS

| 585,242 | 6/1897 | Swenson | 53/211 |
|---|---|---|---|
| 2,893,191 | 7/1959 | Lancaster | 53/214 X |
| 2,936,559 | 5/1960 | Galley et al. | 53/211 |
| 3,924,375 | 12/1975 | Brenner et al. | 53/211 X |
| 4,524,562 | 6/1985 | Yagi et al. | 53/204 X |
| 4,608,807 | 9/1986 | Skripalle | 53/214 X |
| 4,750,955 | 6/1988 | Haguenier | 53/DIG. 2 |
| 5,044,499 | 9/1991 | Marion | 53/389.3 X |
| 5,174,095 | 12/1992 | Fujiwara et al. | 53/211 X |

FOREIGN PATENT DOCUMENTS

| 0181417 | 5/1986 | European Pat. Off. . |  |
|---|---|---|---|
| 0414265 | 2/1991 | European Pat. Off. . |  |
| 23498 | 2/1977 | Japan | 53/372.9 |
| 58-134825 | 8/1983 | Japan . |  |
| 2219717 | 9/1990 | Japan . |  |

Primary Examiner—Linda B. Johnson
Attorney, Agent, or Firm—Sughrue, Mion, Zinn, Macpeak & Seas

[57] ABSTRACT

A packaging apparatus for packaging rolled articles. The apparatus forms a pair of packaging materials for wrapping side portions of the rolled article. Edges of the pair of packaging materials are adhered to additional packaging material which wraps a circumferential portion of the rolled article. A splicer splices a trailing end of the second packaging material to a leading end of the rolled article and a winder winds the leading end of the rolled article and the second packaging material around the periphery of the rolled article. A gusseting device gussets the pair of packaging materials along the sides of the rolled article.

6 Claims, 5 Drawing Sheets

PACKAGING APPARATUS

BACKGROUND OF THE INVENTION

This invention relates to a packaging apparatus for packaging a rolled article with light-shielding materials, and more particularly, relates to a packaging apparatus capable of preparing a package of a rolled article which is openable by extending a leading end of a light-shielding leader.

A package of a rolled article openable by extending a leading end of a light-shielding leader which is wrapped around the periphery of the rolled article is described in EP 0 414 265 A2.

In a package of a rolled article, as shown in FIGS. 7 and 8, the rolled article 1, such as a photographic photosensitive material, is wound around a hollow core 2 having almost the same width as the rolled article 1. A leading end of a light-shielding leader 3 having a width identical with or slightly greater than the rolled article 1 is connected with a leading end of the rolled article 1 so that the side edges B of the rolled article 1 almost conform with the side edges A of the light-shielding leader 3. Light-shielding covers 4, 4 are superposed onto each inner side edge of the light-shielding leader 3, and the superposed portions are heat-sealed. The outer edge C of the heat-sealed portion between the light-shielding leader 3 and the light-shielding cover 4 almost conforms with the side surface B of the rolled article 1, and it becomes a tear reinforcing portion when article 1 is opened.

The light-shielding leader 3 is wrapped around the rolled article 1, and the leading end is fixed to the rolled article 1 by adhesive tape 5. The light-shielding cover 4 is gusseted along the side surfaces of the rolled article 1, and the edges 8 are fixed by a pair of fixing members pressure fitted into the inside of the core 2.

A high density polyethylene film or the like having excellent heat sealability is used as the light-shielding leader 3, and a high density polyethylene film or the like having excellent tearability and heat sealability is used as the light-shielding cover 4.

In use, the package is loaded on a delivery shaft of an apparatus. The leading end of light-shielding leader 3 is extended from rolled article 1 and the light-shielding covers 4 are torn. The tears are guided by the heat-sealed portions and the tears proceed along the outer edges C. When the leading end of the rolled article 1 is extended, light-shielding leader 3 is peeled or cut off the rolled article 1. The rolled article 1 may then be used.

A conventional packaging apparatus for preparing a package of such a rolled article is disclosed in Japanese Patent KOKAI No. 58-2191. The gusseting mechanism of this apparatus, however, is complicated and increases the cost of the apparatus. Also, gusseting is conducted after wrapping the packaging material in this apparatus, and thus it is difficult to shorten cycle time.

A packaging apparatus which wraps and gussets was proposed in Japanese Patent KOKAI No. 58-134825. This packaging apparatus can gusset in a simple mechanism. Moreover, unless articles are large, wrapping gusseting speed is improved.

However, when using a packaging material resistant to creasing, such a polyethylene, it is difficult to convey the packaging material in a U-shaped form and it is difficult to maintain directional accuracy of the packaging material in a cross direction. Moreover, tucks formed by gusseting may break, and it is difficult to stably fix the light-shielding covers. Furthermore, a portion of the packaging material is used as a leader by making it longer than the edge of the light-shielding cover, it is necessary to attach the leader portion as a separate member or to employ a previous punching process, requiring additional equipment.

Thus, it will be appreciated that although various types of apparatus for packaging of a rolled article have been proposed, there is no apparatus for packaging a rolled article which uses a packaging material composed of a light-shielding leader and light-shielding cover adhered to each other.

SUMMARY OF THE INVENTION

An object of the invention is to provide a packaging apparatus capable of preparing efficiently a package comprising a core, a rolled material wound around the core, a light-shielding leader having two side edges adhered to the leading end of the rolled article and light-shielding covers adhered to both of the side edges of the light-shielding leader, the periphery of the rolled article being wrapped by the light-shielding leader and the side surfaces of the rolled article being wrapped by the light-shielding covers.

The present invention provides a packaging apparatus which has achieved the above object, which comprises, a light-shielding cover forming means which forms a pair of packaging materials for wrapping mainly side portions of a rolled article wound around a core, a light-shielding cover adhering means which adheres packaging materials to both side edge portions near the leading end of a web of another packaging material which becomes a light-shielding leader for wrapping mainly the circumferential portion of the rolled article, a light-shielding leader splicing means which splices a trailing end of the light-shielding leader to a leading end of the rolled article, a winding means which winds the leading end of the rolled article and the light-shielding leader around the periphery of the articles, a gusseting means which gussets the light-shielding cover along both sides of the article, a cutting means which cuts the web of the packaging material to form the light-shielding leader, and a fixing means which fixes the light-shielding covers to the core by pressure fitting fixing members having a slightly smaller outer diameter than the inside diameter of the core into the core.

Figure 1:
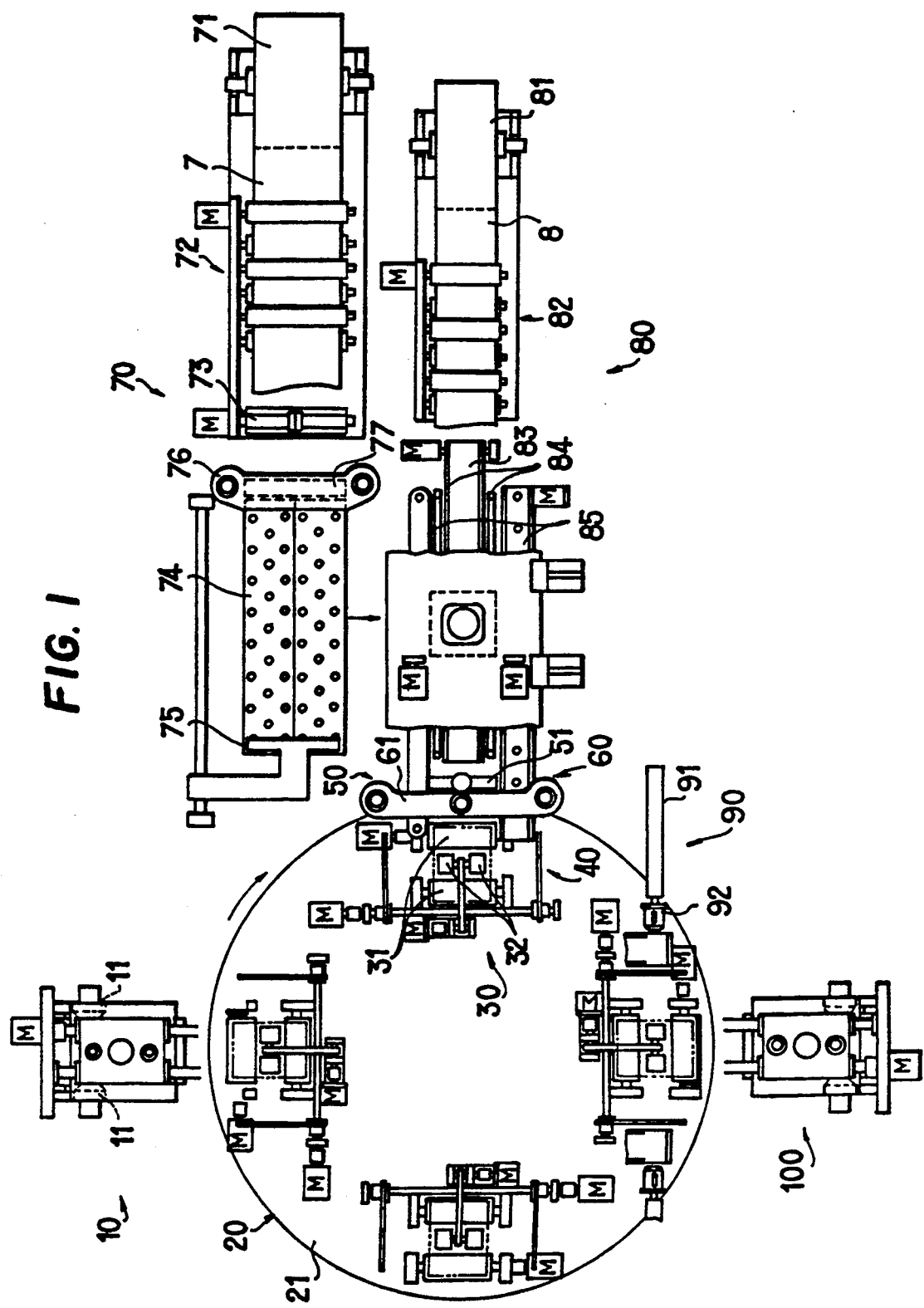
FIG. 1 is a schematic plan view illustrating an embodiment of the packaging apparatus of the invention.
Figure 2:
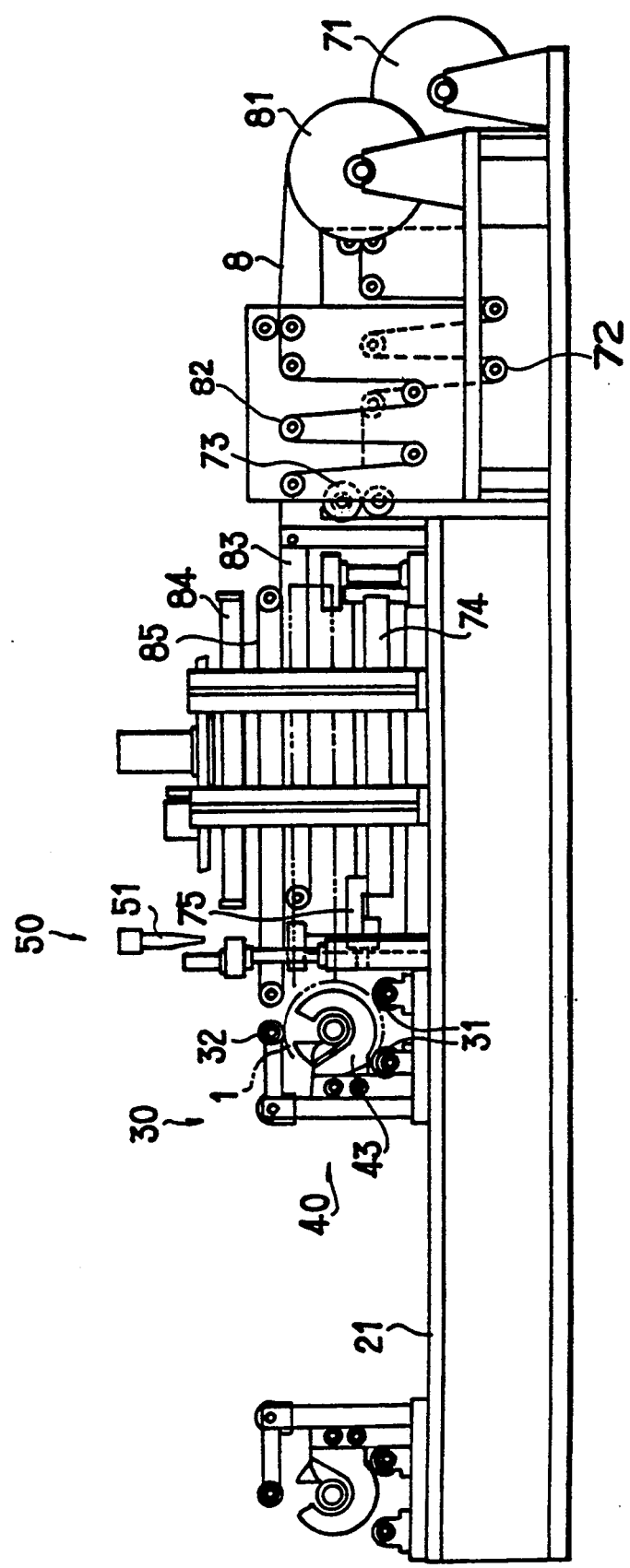
FIG. 2 is a schematic side view thereof.

The following is an identification of selected reference numerals in the figures:

1 . . . Photographic photosensitive material (rolled article)
2 . . . Core
3 . . . Light-shielding leader
4 . . . Light-shielding cover
6 . . . Fixing member
7 . . . Web of packaging material for light-shielding cover
8 . . . Web of packaging material for light-shielding leader
10 . . . Transferring portion of rolled articles
20 . . . Conveying portion of rolled articles
30 . . . Winding portion
40 . . . Gusseting portion
50 . . . Splicing portion for light-shielding leader
60 . . . Cutting portion
70 . . . Light-shielding cover forming portion
80 . . . Adhering portion for light-shielding cover
90 . . . Fixing portion

DETAILED DESCRIPTION OF THE INVENTION

The light-shielding cover forming means may comprise any suitable device for slitting a web of packaging material into two halves, the web slit at almost the center into two webs. A feeding device is provided which feeds a predetermined length of the light-shielding cover which has been slitted. A cutting device is provided which cuts the light-shielding cover. The foregoing can be simplified by using a double web of the packaging material, as mentioned above.

The light-shielding leader splicing means may be any suitable device for positioning a leading end of the rolled article and a trailing end of the light-shielding leader at a position of ultrasonic welding means which splices the trailing end of the light-shielding leader to the leading end of the rolled article.

The gusseting means may be any suitable gusseting device including a pair of feeding rollers which continuously feed the light-shielding covers and a pair of folding rollers which intermittently fold the light-shielding covers. Moreover, the gusseting device may contain a folding device which holds the light-shielding covers by suction while they are adhered to both side edges (near the leading end) of the light-shielding leader, and which folds the light-shielding covers along lines which meet side surfaces of the rolled article. After the light-shielding covers are adhered to the light-shielding leader the light-shielding covers are simultaneously folded along the side surfaces of the article. Accordingly, the light-shielding covers can be folded into a U-shape without excessive force, and subsequently gusseted.

The light-shielding cover adhering means may be any suitable device such as a transferring device which transfers two sheets of the cut light-shielding cover to a position where the side edge portions of each light-shielding cover overlaps each side edges of the light-shielding leader in a predetermined overlapping area and is held at that position, and a heat-sealing device which heat-seals the light-shielding covers to the light-shielding leader at the overlapping portions. After the light-shielding covers are formed by slitting a web into halves and cutting, they are transferred to the adhering device and conveying position accuracy of the light-shielding covers is improved.

Preferably, a positioning device is provided which maintains the center of the web or the packaging material constant by detecting both side edge positions of the web or the packaging material and then correcting the position of the web or the packaging material according to any variation.

A reservoir, nip rollers, etc. are preferably provided on the downstream side of a web roll of the packaging material for the light-shielding cover or a web roll of the packaging material for light-shielding leader, to maintain a stock amount in the reservoir always in a fixed range by the nip rollers, while each web is intermittently conveyed.

The gusseting device and fixing device may be installed at the same location, or to shorten cycle time, they may be installed at different locations. For example, side plates and driving rollers may be installed at the same location or may be separated by utilizing a bucket conveyor, an index and the like.

The rolled article packaged by the packaging apparatus of the invention may be photographic photosensitive materials, information recording paper materials (pressure-sensitive recording paper, heat-sensitive recording paper), etc.

The packaging apparatus of the invention can simply and reliably package a rolled article, which is wound around a core, with a light-shielding leader and light-shielding covers wherein the light-shielding covers are fixed by fixing members to the core.

Because the light-shielding leader is wrapped around the rolled article as a web, tension control and position correction in a cross direction are made simple. Furthermore, since the two processes of winding and gusseting are combined into one process by winding the web of the light-shielding leader and simultaneously gusseting the light-shielding covers, the packaging apparatus of the invention is compact and inexpensive. The end portions of the light-shielding covers can be inserted into the core without upsetting tucks formed by gusseting the light-shielding covers.

Referring now to FIGS. 1 through 6, the packaging apparatus comprises a transferring portion 10 for transferring rolled articles, a conveying portion 20 for conveying rolled articles, a winding portion 30, a gusseting portion 40, a light-shielding leader splicing portion 50, a cutting portion 60, a light-shielding cover forming portion 70, an adhering portion 80, a fixing portion 90 and a discharging portion 100.

The transferring portion 10 feeds the rolled articles 1 to the conveying portion 20, and is provided with a chuck member 11 which chucks the rolled article 1. The chuck member 11 is movable in the vertical and horizontal directions (the longitudinal direction in FIG. 1).

The conveying portion 20 feeds each rolled article 1 delivered from the transferring portion 10 to different stations, and is provided with a round table 21 which is rotatable.

Figure 3:
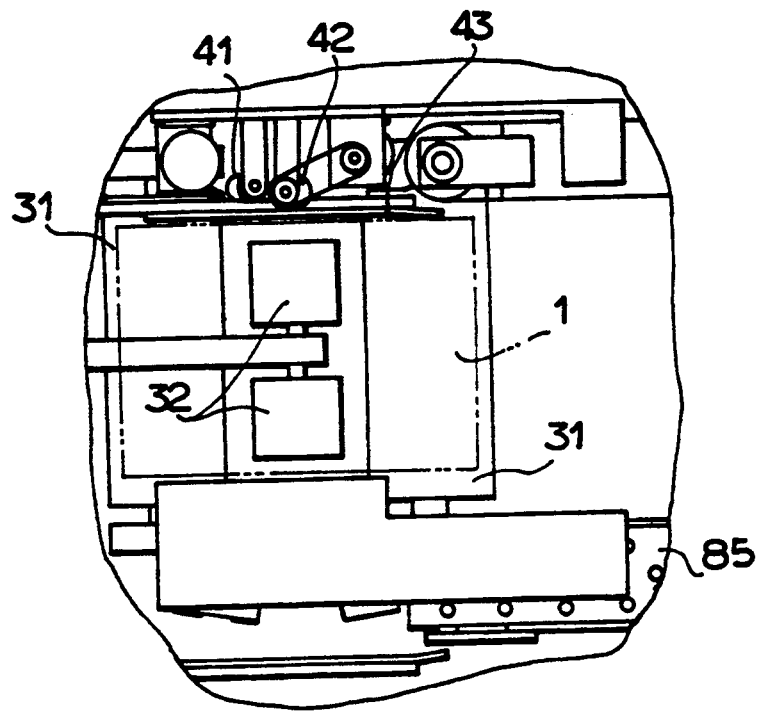
FIG. 3 is a plan view of the main part of the winding portion and the gusseting portion of the packaging apparatus.
Figure 4:
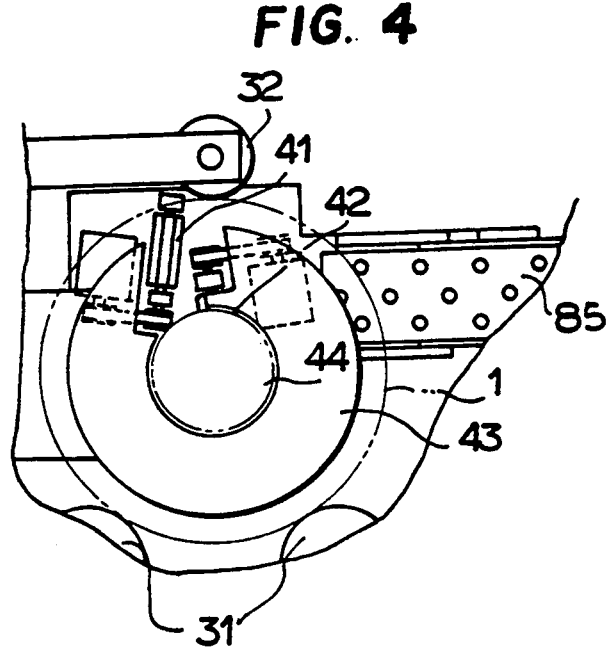
FIG. 4 is a side view thereof.

The winding portion 30 is provided at four locations on the upper side of table 21 at regular intervals (equal angles), and winds the outer end of the rolled article and the light-shielding leader along the periphery of the rolled article. Each winding portion 30 is, as shown in FIGS. 3 and 4, provided with two driving rollers 31 which support and rotate the rolled article 1, rider rollers 32 rotatably disposed above the driving rollers 31 and side plates 43 which hold the tucks of the gusseted light-shielding covers 4.

The gusseting portion 40 is provided on the conveying portion 20 of the rolled articles, and gussets the light-shielding covers along the sides of the article. The gusseting portion 40 is, as shown in FIGS. 3 and 4, provided with folding rollers 41 which fold the light-shielding covers 4 and delivery rollers 42 which deliver the light-shielding covers 4 to the folding roller 41.

The light-shielding leader splicing portion 50 adheres a leading end of the light-shielding leader 3 to a leading end of the rolled article 1.

The cutting portion 60 cuts the light-shielding leader when wrapped around the rolled article.

The table 21 intermittently rotates 90 degrees, and the above transferring portion 10, the gusseting portion 40, the light-shielding leader splicing portion 50 and the cutting portion 60, and the fixing portion 90 are disposed at each stop position.

The light-shielding covers forming portion 70 forms a pair of light-shielding covers which wraps mainly side portions of the rolled article. The light-shielding cover forming portion 70 is rotatably provided with a web roll 71 for supplying the web 7 of the light-shielding cover, and two circular knives 73 are provided vertically in the delivery direction of the web roll 71 through a conveying apparatus 72 including numerous rollers and a motor. The circular knives 73 slit the web 7 of the light-shielding cover at a center thereof into two halves. Two suction boxes 74, 74 are provided on the downstream side of the circular knives 73. The suction boxes 74 fix the light-shielding covers 4, and are movable to the light-shielding cover adhering portion 80. An end delivery apparatus 75 which delivers a leading end of the web 7 of the light-shielding cover is movable forward and backward on the upper side of the suction box 74. A light-shielding cover cutting apparatus 76 is provided, at the end of the suction boxes 74 on the circular knife side, apparatus 76 cuts the web 7 of the light-shielding cover.

Figure 5:
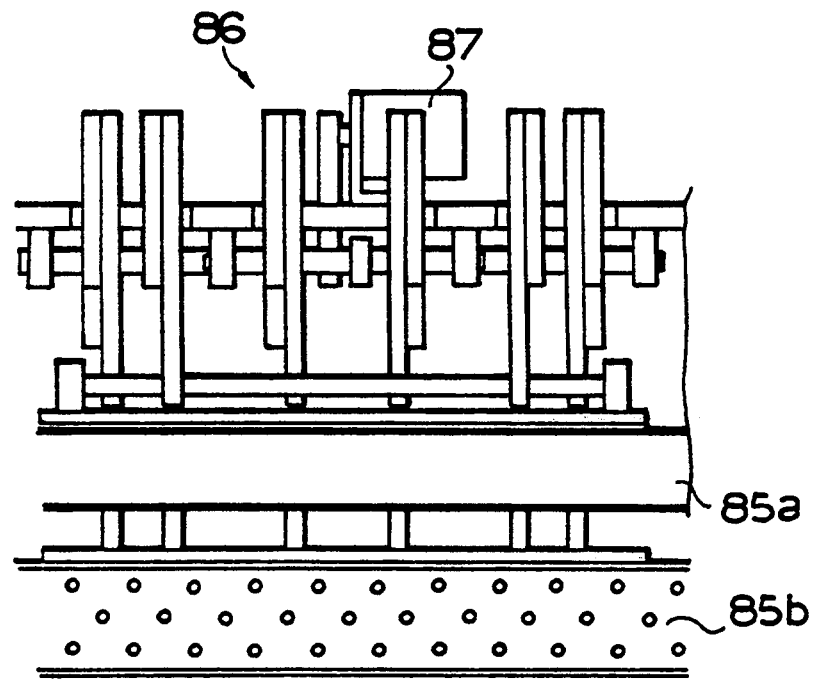
FIG. 5 is a plan view of the main part of the adhering portion of the packaging apparatus.
Figure 6:
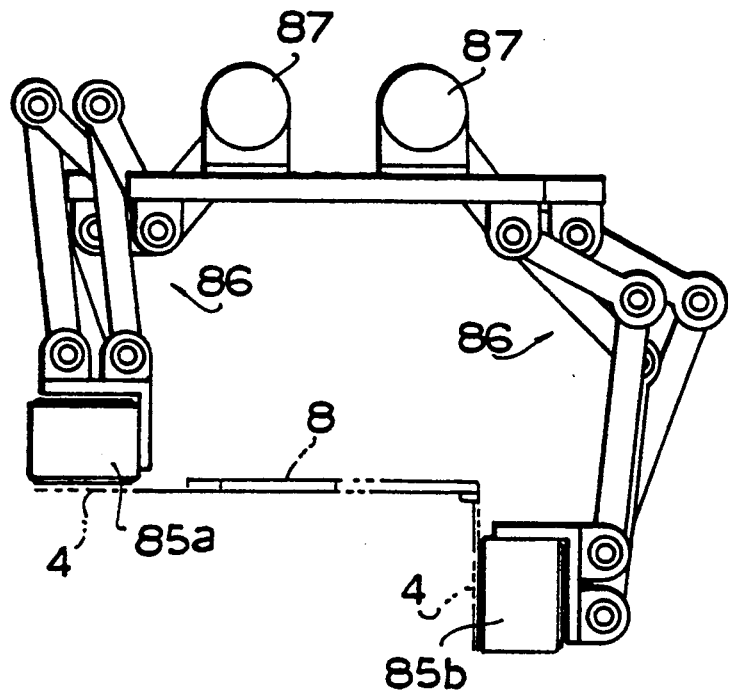
FIG. 6 is a side view thereof viewed in the traveling direction of the web of the light-shielding leader.
Figure 7:
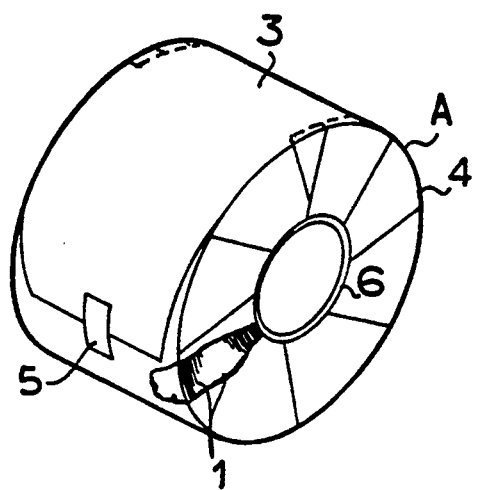
FIG. 7 is a perspective view partially cut away of a package of a rolled material prepared by the packaging apparatus of the invention.
Figure 8:
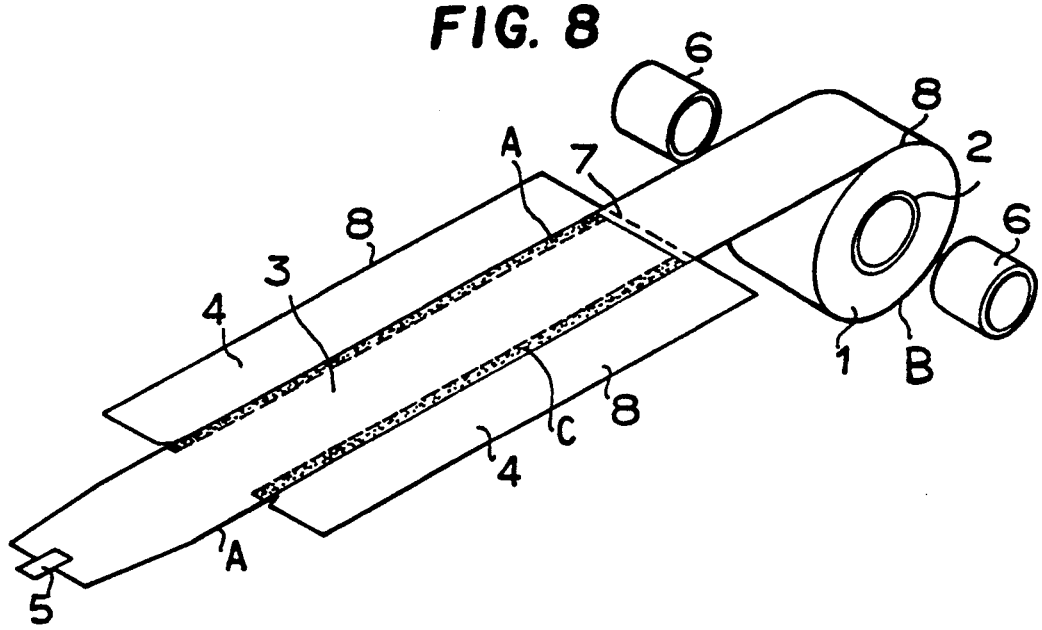
FIG. 8 is a perspective view of a partially unrolled article prepared by the packaging apparatus of the invention.

The light-shielding cover adhering portion 80 adheres the light-shielding covers formed at the light-shielding cover forming portion 70 to both side edge portions near the leading end of the web of the light-shielding leader. The light-shielding cover adhering portion 80 is located in parallel to the light-shielding cover forming portion 70. This portion 80 is provided with a rotatable web roll 81 for supplying the web 8 of the light-shielding leader, and a suction conveyor 83 is provided in the feeding direction of the web roll 81 through a conveying apparatus 82 composing a plurality of rollers and a motor. The suction conveyor 83 has a width narrower than the web 8 of the light-shielding leader, and conveys the web 8 of the light-shielding leader. The suction conveyor 83 is located in parallel to the suction boxes 74. Impulse sealers 84, 84 which adhere the light-shielding covers to the light-shielding leader are provided on both sides of the suction conveyor 83, and suction conveyors 85 and gusseting portions 40 are provided on the outside of the impulse sealers 84. The suction conveyors 85 are rotatable at about 90 degrees downwardly, and convey the light-shielding covers 3. The suction conveyors 85 are, as shown in FIGS. 5 and 6, connected to motor 87 through link mechanism 86, and are rotatable at about 90 degrees by the motion of the link mechanism 86. FIGS. 5 and 6 illustrate both positions of the suction conveyor 85. Suction conveyor 85a is in position parallel to the suction conveyor 83, and suction conveyor 85b is in a position oriented 90 degrees to the suction conveyor 83. The suction conveyors 85 are synchronized with the suction conveyor 83.

The light-shielding cover adhering portion 80 is provided at an end of the packaging apparatus in a conveying direction with the light-shielding leader splicing portion 50 and the cutting portion 60. In the light-shielding leader splicing portion 50, an ultrasonic sealer 51 is disposed between the suction conveyors 85, 85 at a short distance from an end of the suction conveyor 83. In the cutting portion 60, a cutter 61 is provided at a short distance in the conveying direction from the ultrasonic sealer 51. The position of the light-shielding leader splicing portion 50 and the cutting portion 60 correspond to the position where the winding portion 30 exists when the table 21 is stopped.

The fixing portion 90 inserts fixing members (bushes) using pressure into the rolled article wrapped by the light-shielding leader and the light-shielding cover at the winding portion 30 and the gusseting portion 40. Fixing portion 90 includes two cylinders 91 and a bush-holding member 92 attached to the end of a plunger of a cylinder 91.

The discharging portion 100 discharges the completed package of the rolled article.

When packaging a rolled article using the above packaging apparatus, first, the rolled article 1 is nipped by the chuck member 11 of the transferring portion 10, and is fed to the winding portion 30. Then, the conveying portion 20 of the rolled articles is rotated 90 degrees (in a direction to the right in FIG. 1), and the rolled article 1 is positioned facing the light-shielding leader splicing portion 50 and the cutting portion 60.

At the light-shielding cover forming portion 70, the conveying apparatus 72 feeds the web 7 of the light-shielding cover from the web roll 71, and the end feeding apparatus 75 holds and pulls (in the left direction in FIG. 1) a leading end of the web 7 of the light-shielding cover. Then, the web 7 of the light-shielding cover is slitted at a center thereof by the circular knives 73, and is conveyed on the suction boxes 74. After the end feeding apparatus 75 reaches the terminal end, the web 7 of the light-shielding cover is sucked by the suction boxes 74, and the web 7 is cut by the light-shielding cover cutting apparatus 76. Thus, a pair of the light-shielding covers 4, 4 are formed.

The suction boxes 74 which hold the light-shielding covers 4 by suction move in the direction toward the light-shielding cover adhering portion 80 (in the downward direction in FIG. 1) and ascend, and are positioned under the impulse sealers 84. At that time, in the light-shielding cover adhering portion 80, the web 8 of the light-shielding leader covers almost the whole face of the suction conveyor 83.

Then, in the state that the light-shielding covers 4 are superposed onto both side edges of the web 8 of the light-shielding leader, the superposed portions are heat-sealed by the impulse sealers 84. After heat-sealing, the suction boxes 74 return to the first place, and the light-shielding covers 4 are folded at about a right angle by rotating the suction conveyors 85 downwardly 90 degrees. At the same time, a leading end of the web 8 of the light-shielding leader to which the light-shielding covers 4 are spliced is superposed with the leading end of the rolled article 1 which is a photographic photosensitive material positioned at the winding portion 30, and the superposed portions are spliced by ultrasonic sealer 51.

Subsequently, the driving rollers 31 are rotated, and the suction conveyors 83, 85 are synchronized with the driving rollers 31. Then, the rolled article 1 rotates, and a fixed length of the web 8 of the light-shielding leader is wound to cover the periphery of the rolled article 1. Simultaneously, the light-shielding covers 4 are also conveyed (since the feeding rollers 42 and the folding rollers 41 rotate) and the light-shielding covers 4 are fed to the folding rollers 41. Then, the light-shielding covers 4 are periodically gusseted by the folding rollers 41 so that tucks are formed, and the tucks are held by the side plates 43.

When winding of the web 8 of the light-shielding leader is finished, the web 8 is cut by the cutting portion 60 to form the light-shielding leader 3. Then, the table 20 turns 90 degrees, and at the fixing portion 90, the bushes 6 attached to the bush-holding members 92 are inserted together with side edges of the light-shielding covers 4 into the core 2 using pressure to fix the light-shielding covers 4 to the core 2. Thus, the package of the rolled article is completed- Then, the package is discharged from the winding portion 30 at the discharging portion 100.

We claim:

1. A packaging apparatus, comprising:
   a forming means for forming a pair of first packaging materials for wrapping side portions of a rolled article wound around a core,
   an adhering means for adhering the pair of first packaging materials to side edge portions, respectively, of a second packaging material, the second packaging material wrapping a circumferential portion of the rolled article,
   a splicing means for splicing a trailing end of the second packaging material to a leading end of the rolled article, and
   a gusseting means for gusseting the first packaging materials along sides of the rolled article,
   wherein the forming means comprises a means for slitting a web of the first packaging material into the pair of first packaging materials, a feeding means for feeding the pair of first packaging materials and a cutting means for cutting the pair of first packaging materials,
   and the adhering means comprises a transferring means for transferring the pair of first packaging materials to a position wherein a side edge of a first one of the pair of first packaging materials overlaps a first side edge of the second packaging material and a side edge of a second one of the pair of first packaging material overlaps a second side edge of the second packaging material, and a heat-sealing means for heat-sealing the overlapping edges of the first and second packaging materials.

2. The packaging apparatus of claim 1, wherein the gusseting means comprises a pair of feeding rollers for continuously feeding the first packaging material, rollers for intermittently folding the first packaging material, and folding means for wrapping the first packaging material onto side surfaces of the rolled article.

3. The packaging apparatus of claim 1 wherein the rolled article is a photographic photosensitive material.

4. The packaging apparatus of claim 1, wherein the heat-sealing means is an impulse sealer.

5. The packaging apparatus of claim 2, wherein the folding means includes means for wrapping the pair of first packaging materials onto the whole side portions of the rolled article.

6. The packaging apparatus of claim 1, wherein the adhering means includes means for adhering the pair of first packaging materials to the second packaging material at a portion of the second packaging material located away from a leading end of the second packaging material to form a portion of the second packaging material free of the pair of first packaging materials for opening the rolled article by tearing the first packaging materials at locations where the first packaging materials are adhered to the second packaging material.

* * * * *